United States Patent
Kaske et al.

(10) Patent No.: US 10,807,901 B2
(45) Date of Patent: Oct. 20, 2020

(54) METHOD FOR PRODUCING AN OPTICAL BLANK FROM SYNTHETIC QUARTZ GLASS

(71) Applicant: Heraeus Quarzglas GmbH & Co. KG, Hanau (DE)

(72) Inventors: Andreas Kaske, Bruchkoebel (DE); Klaus Becker, Hanau (DE); Stefan Ochs, Gelnhausen (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 353 days.

(21) Appl. No.: 15/712,741

(22) Filed: Sep. 22, 2017

(65) Prior Publication Data

US 2018/0079674 A1 Mar. 22, 2018

(30) Foreign Application Priority Data

Sep. 22, 2016 (EP) ..................................... 16190056

(51) Int. Cl.
  *C03B 20/00* (2006.01)
  *C03B 19/14* (2006.01)

(52) U.S. Cl.
  CPC ...... *C03B 19/1453* (2013.01); *C03B 19/1469* (2013.01); *C03B 19/1484* (2013.01); *C03B 20/00* (2013.01); *C03B 2201/02* (2013.01)

(58) Field of Classification Search
  CPC ...... C03B 11/08; C03B 20/00; C03B 19/1453
  See application file for complete search history.

(56) References Cited

U.S. PATENT DOCUMENTS

| | | | | |
|---|---|---|---|---|
| 2,924,046 A | * | 2/1960 | Cummins | ................. C03B 5/20 65/122 |
| 3,261,676 A | * | 7/1966 | Morelock | ............. C04B 35/653 65/17.6 |
| 4,065,286 A | * | 12/1977 | Becker | ...................... C03B 7/16 65/229 |

(Continued)

FOREIGN PATENT DOCUMENTS

| | | |
|---|---|---|
| DE | 4204406 | 8/1993 |
| DE | 10041467 | 2/2002 |

(Continued)

*Primary Examiner* — John M Hoffmann
(74) *Attorney, Agent, or Firm* — Dicke, Billig & Czaja, PLLC

(57) ABSTRACT

One aspect relates to a method for producing an optical blank from synthetic quartz glass by vitrifying and shaping a porous, cylindrical SiO$_2$ soot body having a longitudinal axis, in a heating zone including a melt mold with bottom plate. The SiO$_2$ soot body vitrified in the heating zone at a vitrification temperature so as to form a full cylindrical, completely vitrified, transparent quartz glass body. Subsequently, the vitrified quartz glass body is shaped by softening in the melt mold at a softening temperature so as to form a viscous quartz glass mass which partly fills the volume of the melt mold, and cooling the quartz glass mass and removal from the melt mold so as to form the optical blank. During shaping in the melt mold, the full cylindrical quartz glass body is brought into contact by way of controlled supply with a centering means of the bottom plate.

20 Claims, 1 Drawing Sheet

(56) References Cited

U.S. PATENT DOCUMENTS

| | | | | |
|---|---|---|---|---|
| 4,612,023 A * | 9/1986 | Kreutzer | ................ | C03B 19/02 373/27 |
| 5,443,607 A * | 8/1995 | Englisch | ................ | C03B 32/00 65/64 |
| 7,155,936 B2 * | 1/2007 | Dawes | ................ | C03B 19/02 65/102 |
| 2003/0079503 A1 * | 5/2003 | Cook | ................ | C03B 23/20 65/407 |
| 2009/0183526 A1 | 7/2009 | Schmidt et al. | | |

FOREIGN PATENT DOCUMENTS

| | | |
|---|---|---|
| DE | 102006024831 | 11/2007 |
| JP | 5270848 | 10/1993 |
| JP | 2001199733 | 7/2001 |
| JP | 2004123439 | 4/2004 |
| WO | 2009090257 | 7/2009 |

\* cited by examiner

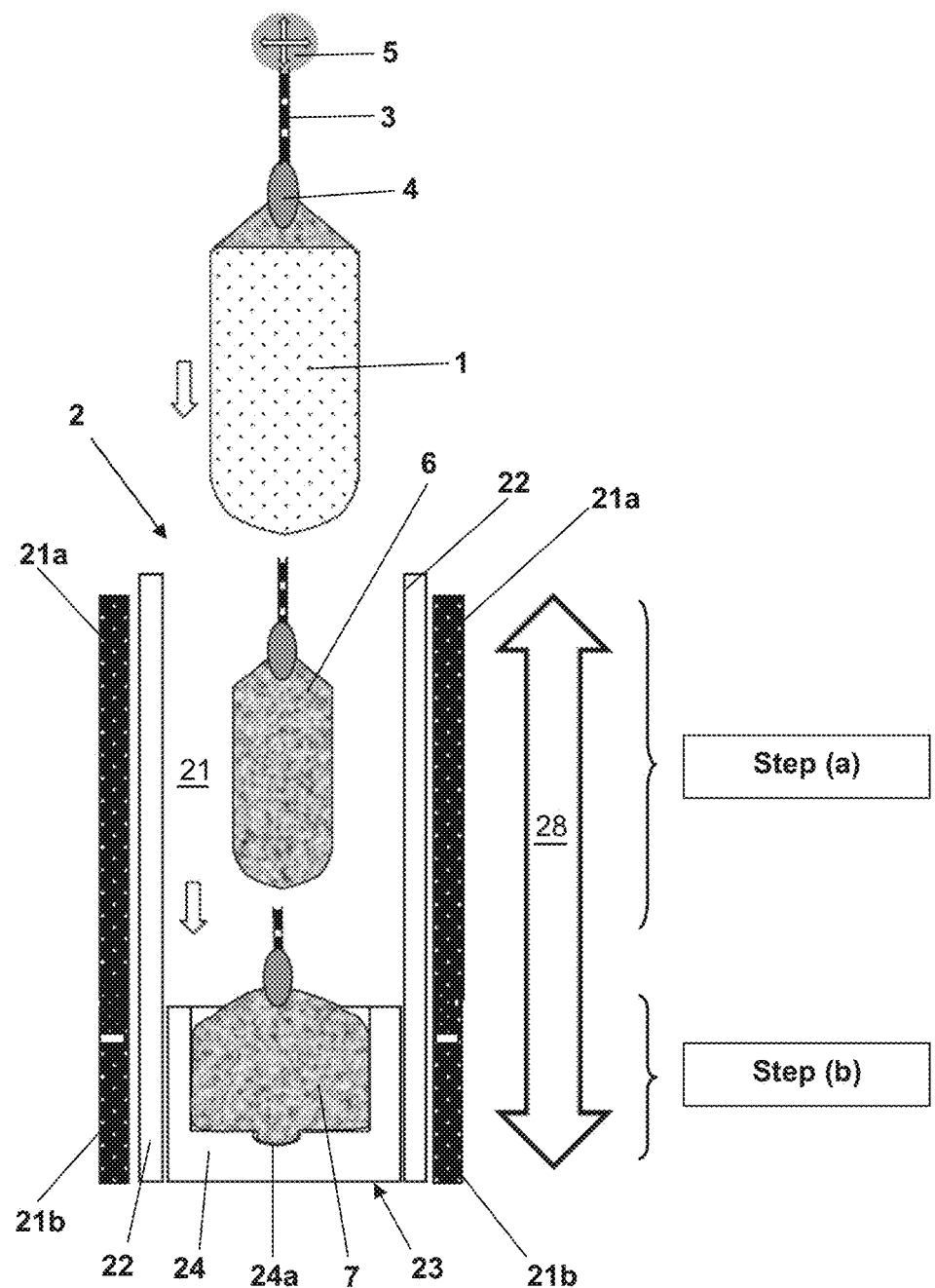

METHOD FOR PRODUCING AN OPTICAL BLANK FROM SYNTHETIC QUARTZ GLASS

CROSS-REFERENCE TO RELATED APPLICATIONS

This Utility Patent Application claims priority to European Patent Application No. EP 16 190 056.8, filed on Sep. 22, 2016, which is incorporated herein by reference.

BACKGROUND

One aspect refers to a method for producing an optical blank from synthetic quartz glass by vitrifying and shaping a porous, cylindrical $SiO_2$ soot body having a longitudinal axis, in a heating zone including a melt mold with bottom plate, the method including the following steps:

(a) vitrifying the $SiO_2$ soot body in the heating zone at a vitrification temperature so as to form a full cylindrical, completely vitrified, transparent quartz glass body, and directly subsequently (b) shaping the vitrified quartz glass body by softening in the melt mold so as to form a viscous quartz glass mass which fully or partly fills the volume of the melt mold, and (c) cooling the quartz glass mass and removal from the melt mold so as to form the optical blank.

For instance components for use in semiconductor manufacture, optical components, such as lenses or mirrors in microlithography, or preforms for optical fibers for communications engineering are produced from the blank of synthetic quartz glass.

Synthetic quartz glass is normally produced by way of flame hydrolysis or oxidation of a silicon-containing starting compound by using deposition burners. A well-established starting compound for the manufacture of synthetic quartz glass is silicon tetrachloride ($SiCl_4$). However, many other organosilicon compounds are known, from which $SiO_2$ can be formed by hydrolysis or by oxidation. Chlorine-containing or chlorine-free silanes, silazanes or polysiloxanes are here mentioned by way of example. Of these, the chlorine-free polysiloxane octamethyl-cyclotetrasiloxane (OMCTS) has turned out to be particularly useful.

Known production methods are the VAD method (vapor phase axial deposition), the OVD method (outside vapor phase deposition) or plasma-supported deposition methods, such as the POD method (plasma outside deposition). Other methods use molds in which quartz glass bodies are built up from the bottom to the top by vertical deposition of $SiO_2$ particles and direct vitrification. In all of these procedures $SiO_2$ particles are produced with the help of one or several deposition burners and are deposited layer by layer on a carrier which is moving relative to a burner flame. At an adequately high temperature in the area of the carrier surface the $SiO_2$ particles are directly vitrified ("direct vitrification"). By contrast, in the so-called "soot method" the temperature is so low during deposition of the $SiO_2$ particles that a porous $SiO_2$ soot body is obtained that is sintered and vitrified, respectively, in a separate method step into transparent quartz glass. In the end both direct vitrification and soot method yield a dense, transparent, synthetic quartz glass of high purity. One embodiment refers to the manufacture of synthetic quartz glass via the intermediate stage of the soot body.

As a rule, the $SiO_2$ soot bodies have a high content of hydroxyl groups (OH groups) due to the manufacturing process. These have an impact on the optical transmission of the resulting quartz glass and on the viscosity of the quartz glass and its resistance to short-wave UV radiation. Therefore, in the manufacture of synthetic quartz glass, attention is generally paid that a predetermined content of hydroxyl groups is observed, and many methods have been suggested for minimizing the hydroxyl group content in the soot body or for adjusting it to a predetermined value. For instance, the porous soot body is subjected to a dehydration treatment in a chlorine-containing atmosphere at a high temperature of about 1000° C., resulting in a substitution of OH groups by chlorine. Alternatively, drying of the soot body may also be carried out in a fluorine-containing atmosphere, which is accompanied by fluorine doping. When the incorporation of chlorine or fluorine into the $SiO_2$ network is to be avoided, thermal drying is carried out, in which the soot body is dehydrated under vacuum at a temperature of about 1100° C. in a heating furnace with a heating element of graphite.

A body of transparent quartz glass is produced from the pretreated soot body by way of sintering (=vitrification). As a rule, the dried or otherwise pretreated soot body is introduced into an evacuable vitrification furnace for this purpose and is sintered therein so as to form a transparent quartz glass body. Subsequently, the vitrified quartz glass body is given the predetermined final shape of the blank or semifinished product by way of mechanical shaping or by hot working.

Hot working is often accompanied by homogenization measures for reducing striae and layers. DE 42 04 406 A1, for instance, suggests a multi-stage deformation process in which a twist bar of quartz glass is introduced for the elimination of an axial layer structure into a casting mold of graphite which is formed in the shape of an inverted "T", with vertically oriented supply nozzle that at its lower end branches at two sides into a horizontally oriented tubular outlet mold of a square cross-section. The twist bar softens within the supply nozzle, thereby sinking under its own weight into the horizontal outlet mold in such a manner that it is shaped into a bar-shaped quartz glass cylinder of square cross-section in which the remaining layers extend in parallel with the longitudinal axis of the bar and can easily be removed by twisting around the longitudinal axis.

DE 100 41 467 C1 suggests that dehydration treatment and vitrification of the soot body should be carried out in a joint furnace and that during vitrification of the soot body the final form of the blank should simultaneously be set by plastic shaping. In one embodiment, a gas-permeable graphite mold is used, which includes an upper portion with accommodating means of a wide cross-section adapted to the outer diameter of the soot body, here a hollow cylinder, the upper portion passing via a funnel-shaped transition into a lower portion of a narrower cross-section. The lower portion of the graphite mold is adapted to the outer diameter of the semifinished quartz glass product to be produced and defines the final shape thereof. The soot body to be vitrified is inserted into the accommodating portion of the graphite mold, with a holding rod with a plate being introduced into the longitudinal bore of the soot body for stabilizing the soot body. In this way the soot body is first held in an upper colder portion of a furnace and is there acted upon with chlorine gas. The temperature prevailing during the chlorine treatment is about 950° C. Following this process step the soot body is lowered together with the graphite mold into furnace regions having an elevated temperature around 1350° C. and is pre-sintered in a helium atmosphere for a period of about 12 h. In the pre-sintering process, a certain volume contraction of the soot body is observed. The soot body is subsequently vitrified at a temperature of about 1750° C. in that the graphite mold, including the pre-sintered soot body, is lowered further towards the furnace portion having an even higher temperature. After a residence time of 8 hours in this position the pre-sintered, hollow-cylindrical soot body is softened to such an extent that it flows off under its own weight through the funnel-shaped transition into the lower part of the mold. The sluggish flow-off can be supported by pressure exerted from above. After cooling the graphite mold is opened and a quartz glass molding is removed that can be used without further finishing work as a block-shaped semifinished product for producing quartz glass components for optics or for semiconductor manufacture.

However, when the viscous $SiO_2$ mass flows off into the lower portion of the graphite mold, unforeseeable bubble inclusions or dislocations may arise that are noticed as striae or bubble nests. Such fusion defects impair the quality of the final product. For instance, bubbles reduce the resistance of quartz glass components to etching processes, as are usual in semiconductor manufacture. Such fusion defects make the semifinished product unusable also in the field of microlithography and must be removed in a troublesome way. Apart from this, the known method is only suited for hollow-cylindrical soot bodies in which the longitudinal bore is used for introducing a centering device. Due to the centering device a hollow cylinder of quartz glass is obtained after shaping with a bore having a diameter of about 50 mm to 80 mm.

It is also suggested in DE 10 2006 024 831 A1 that vitrification of the soot body and shaping into a blank should be carried out in a joint furnace. However, vitrification and shaping are not carried out at the same time, but in successive process steps.

The starting point is a hollow-cylindrical soot body which was produced by means of a standard OVD method by way of outside deposition of $SiO_2$ particles on a mandrel rotating about its longitudinal axis. The soot body is supported in its longitudinal bore by a holding rod or carrier tube and is seated on a bottom plate of a melt mold. Thus, the carrier tube serves not only as a holder, but is particularly operative as a formative element for the inner bore to be produced in the blank to be manufactured. In this arrangement, the soot body is supplied to the vitrifying and shaping furnace. In the heating zone of the furnace, the soot body vitrifies continuously, starting from above, and the shaping then begins by deformation of the lower portion of the vitrified quartz glass body in the melt mold. The quartz glass body gradually softens on the whole and flows out into the melt mold. Since the carrier tube remains during vitrification and shaping, a hollow-cylindrical molding is obtained as the blank.

The method according to DE 10 2006 024 831 A1 as well as the previously described method according to DE 100 41 467 C1 are restricted to the manufacture of hollow-cylindrical blanks. Although the carrier tube is used as a centering device, further measures, such as a gap which is as small as possible (not more than 50 mm) between the inner wall of the melt mold and the outer wall of the soot body or the sintered quartz glass body, respectively, are required to avoid a delayed heat transfer and particularly dislocations in the shaping process. Moreover, since attention must be paid during vitrification that the quartz glass body does not shrink onto the carrier tube, the gap between carrier tube and quartz glass body reduces the centering action of the carrier rod during shaping. Therefore, even in case of an exact centering of the carrier tube, this may lead to deviations from a concentric alignment of the quartz glass body in the melt mold. A readjustment of the carrier tube in case of a need for correction is not intended. In this respect the function of the carrier tube as a centering device is not adequate for holding the vitrified quartz glass body in a centered position and for ensuring a controlled shaping process. Moreover, fusion defects due to bubble inclusions may arise if the vitrification process of the soot body from the top to the bottom in a progressive manner is after all not complete at the lower end of the soot body without this being noticed and if this region is immediately subjected to the shaping process in the melt mold.

Furthermore, the vitrification of a full cylindrical $SiO_2$ soot body which was produced by way of the VAD method is known from JP 2004-123439 A. In one embodiment the soot body is moved fixed to a suspension device into a furnace, with a melt mold acting from below at an increased pressure on the soot body. A transparent quartz glass body is formed at a pressure of 10,000 Pa and at a temperature of 1300° C. This is followed by a further temperature rise to 1600° C. at a pressure of 0.2 MPa, which leads to the softening and shaping of the quartz glass body in the melt mold. The center of the melt mold is aligned with the suspension device.

JP 2001-199733 A also discloses the manufacture of a quartz glass body with vitrification and shaping of a $SiO_2$ soot body, here however in one single method step. In this case the soot body rests on the edge of a mold and flows out into the mold under its own weight at a temperature of 1750° C. to 1800° C.

A similar procedure as in JP 2001-199733 A is also provided according to JPH05-270848 A. The $SiO_2$ soot body is introduced, suspended from a holder, into a furnace and is there heated step by step up to 1850° C. The evolving transparent quartz glass body is here softened to such a degree that it flows into a mold placed in the lower portion of the furnace.

For these and other reasons, a need exists for the present embodiments.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 1 illustrates a schematic process diagram for performing the method according to one embodiment.

DETAILED DESCRIPTION

In the following Detailed Description, reference is made to the accompanying drawings, which form a part hereof, and in which is shown by way of illustration specific embodiments in which the embodiments may be practiced. In this regard, directional terminology, such as "top," "bottom," "front," "back," "leading," "trailing," etc., is used with reference to the orientation of the FIGURE(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the embodiments. The following detailed description, therefore, is not to be taken in a limiting sense, and the scope of the embodiments is defined by the appended claims.

It is to be understood that the features of the various exemplary embodiments described herein may be combined with each other, unless specifically noted otherwise.

One embodiment is a method for the vitrification and shaping of $SiO_2$ soot bodies, whereby full cylindrical blanks of synthetic quartz glass are obtained with reproducible high quality, high purity and homogeneous, rotation-symmetrical property profiles, such as, for example, the refractive index profile.

In one embodiment, starting from the method of the above-mentioned type, during shaping in the melt mold according to method step (b) the full cylindrical quartz glass body is brought into contact by way of controlled supply with a centering means of the bottom plate.

The method according to one embodiment starts from a soot body which after drying is vitrified in a joint furnace system and is subsequently shaped in a melt mold into the blank of synthetic quartz glass. During vitrification of the $SiO_2$ soot body a full cylindrical quartz glass body is formed having rotation-symmetrical property profiles. In one embodiment, the soot body has been built up with the help of the VAD method as a full cylindrical molding and has a rotation-symmetrical property profile. Starting from this body, corresponding, full cylindrical blanks of synthetic quartz glass are produced. Vitrification and shaping in a single furnace guarantees an efficient manufacturing process without intermediate storage or transportation and thereby fulfills the high demands made on the purity of the synthetic quartz glass for use in optics or as a process component in the semiconductor industry.

Furthermore, a holding rod or bar as in the prior art is not used during softening of the vitrified, full cylindrical quartz glass body in the melt mold in centered orientation, but centering is carried out by controlled supply and contacting of the quartz glass body with a centering means on the bottom plate of the melt mold. Tilting of the quartz glass body is prevented by the centering means on the bottom plate of the melt mold, so that the rotation symmetry is maintained during shaping and the homogeneous rotation-symmetrical property profiles are thus transmitted from the vitrified quartz glass body to the blank.

It has been found that a bubble-free and striae-free shaping is only possible if the soot body is completely vitrified and is then present as a quartz glass body. The defined separation and time sequence of vitrification process and shaping process avoids inclusion gases, as are for instance created when soot material in a still porous state is enveloped and encased by viscous quartz glass mass.

The quartz glass body is shaped following vitrification and without interim cooling in the same furnace system, but at a higher temperature than the vitrification temperature, and by introduction into a melt mold. The melt mold has a bottom plate with a centering means which, upon placement of the full cylindrical quartz glass body on the bottom plate, centers the same there centrally, thereby preventing a tilting or displacement on the bottom plate. The full cylindrical quartz glass body has no planar front surface on its lower end, but a semispherical dome that adapts well to the centering means in the bottom plate. The quartz glass body softens due to the increased temperature into a viscous mass which is distributed in the melt mold and fills the inner volume thereof completely or in part, so that after cooling the blank can be removed from the melt mold. The full cylindrical blank produced in this way substantially exhibits the same rotation-symmetrical property distribution as the full cylindrical $SiO_2$ soot body fed into the heating zone. Thus, owing to the method according to one embodiment, homogenization measures on the blank, such as twisting, are not needed. Moreover, an exchange of the furnace system after vitrification is not needed, whereby the risk of the introduction of impurities is minimized.

It has been found to be particularly advantageous in one embodiment when the centering means on the bottom plate is configured as a rotation-symmetrical trough. Such a trough or through-like recess is centrally arranged in the bottom plate and adapts in an optimum way to the lower end of the vitrified quartz glass body which has a full cylindrical shape and is normally at its ends without a straight front surface, but is provided with a dome which acts as a counterpart to the trough in the bottom plate. This design of the centering means promotes a homogeneous outflow of the softened quartz glass mass while maintaining rotation-symmetrical property profiles.

Furthermore, with respect to a particularly exact supply it has turned out to be useful when the controlled supply into the melt mold is carried out by way of a holding device acting on the upper end of the vitrified quartz glass body, in combination with a movement unit. Hence, the vitrified quartz glass body is guided on its upper end and on its lower end. The holding device on the upper end of the quartz glass body includes for instance a graphite chain with a so-called handle of quartz glass. The movement unit acts on the holding device and controls the vertical and radial movement of the soot body into the heating zone and of the quartz glass body into the melt mold and during shaping of the quartz glass body.

Advantageously in one embodiment, the movement unit includes a force transducer which records the vertical force upon placement of the vitrified quartz glass body on the bottom plate of the melt mold and during shaping of the quartz glass body in the melt mold and allows an optimal adjustment of the feed rate.

The vitrified quartz glass body is shaped in the melt mold, advantageously in one embodiment starting with its lower end from the bottom to the top, the supply being controlled such that a mass of the quartz glass body supplied per time unit corresponds to the quartz glass mass softened per time unit. This measure moves or lowers the vitrified quartz glass body at a speed corresponding to the degree of the shaping operation by way of outflow of the softened quartz glass body. The outflow speed is here determined by the softening temperature and the mass of the quartz glass body supplied.

After the quartz glass body has been seated on the bottom plate of the melt mold in a centered position, the shaping process starts by way of outflow. The holding device consisting of handle and graphite chain will just yield to such a degree that the whole assembly with the partly not yet softened quartz glass body remains stretched and a uniform, rotation-symmetrical outflow of the softened quartz glass mass is ensured. During shaping between the lower end of the quartz glass body and the viscous quartz glass mass at a height level within the melt mold a more or less spherical transition region is created. This transition region corresponds approximately to the fill level of the viscous quartz glass mass in the melt mold or is slightly above the fill level.

The completely vitrified quartz glass body is lowered for the purpose of shaping with the help of the handle at the upper end of the quartz glass body into the melt mold positioned at the lower end of the furnace and the heating zone, respectively, so that it is seated on the bottom plate of the melt mold in a centered position. A feed rate in the range between 2 and 4 mm/min during contacting with the centering means of the bottom plate and shaping has turned out to be useful. A feed rate in this range allows accurate contacting with the centering means of the bottom plate.

Shaping is in one embodiment carried out in a sub-area of the heating zone, the length of which is not more than half the length of the full cylindrical quartz glass body to be shaped.

At the beginning of the shaping process the upper portion of the full cylindrical quartz glass body is still at vitrification temperature, so that softening and shaping do not take place in this portion. Hence, a softening of the quartz glass body in portions, starting from below, takes place, and a defined shaping process which is gradually progressing upwards is ensured. In this connection attention must also be paid that the high softening temperature required for the softening of quartz glass may also lead to nucleation and to undesired growth of cristobalite crystals in the quartz glass. It is therefore intended to expose the quartz glass to particularly high temperatures only for a period of time as is needed.

The softening temperature is in one embodiment set in the range between 1650° C. and 1850°.

Due to the softening temperature which is elevated by comparison with the vitrification temperature in the area of the melt mold the quartz glass body softens forming a viscous quartz glass mass which fills the volume of the melt mold completely or in part. Owing to the trough-like recess as a centering means in the bottom plate of the melt mold and owing to the guidance (handle, graphite chain and movement unit) at the upper end of the quartz glass body, a tilting or displacement of the quartz glass body is prevented. The rotation-symmetrical property profile which is applied during deposition of the full cylindrical soot body can thereby be maintained.

In one embodiment, the full cylindrical quartz glass body is shaped at a substantially constant softening temperature for a period of 15 min to 200 min.

The shaping step is followed by the vitrification step and is carried out at a substantially constant temperature. Depending on the volume of the quartz glass body to be shaped, the softening temperature and the duration of the operative temperature is clearly above the vitrification temperature. In an end phase of the shaping step the shaping process for obtaining the desired, full cylindrical geometry of the blank is substantially completed; just the walls and the top side of the blank must still be smoothed, for which a phase in the range of the elevated softening temperature is enough.

This measure is particularly effective when the shaped quartz glass body is uniformly heated within a temperature field that is as homogeneous as possible. With respect to the porous $SiO_2$ soot body to be processed, it is particularly advantageous in one embodiment when the body is a full cylindrical soot body produced according to the VAD method.

The deposition of $SiO_2$ soot particles in layers on the front surface of a rotating quartz glass rod according to the VAD method yields a full cylindrical soot body having a longitudinal axis. This soot body has a homogeneous property profile because the speed of the substrate rod and the control of the deposition burners are matched to one another. By comparison with the soot deposition by way of an OVD method in which the soot body is growing in its diameter on a substrate tube as a hollow-cylindrical body, the soot body produced according to the VAD method and the full cylindrical body shaped therefrom have no property profile defect in the central region. As for the manufacture of a full cylindrical blank with a homogeneous, rotation-symmetrical property profile, a full cylindrical $SiO_2$ soot body which has been produced according to the VAD method is advantageous in one embodiment as the starting material in the method according to one embodiment.

In one embodiment, in the vitrification according to method step (a) the heating zone acts on the soot body in vertical orientation of its whole length. In this case the full cylindrical soot body is subjected to the heat action on its whole circumferential surface. Vitrification takes place uniformly radially from the outside to the inside, resulting in a certain volume contraction, but without any substantial change in the ratio of the soot body dimensions to one another. Likewise, the property profile of the soot body is maintained and is transferred to the fully vitrified quartz glass body.

Alternatively, it may also be advantageous in one embodiment when the soot body is vitrified in vertical orientation of its longitudinal axis zonewise starting with its lower end from the bottom to the top. The soot body to be vitrified is first supplied from above to the heating zone, so that vitrification starts at its lower end. By way of a further lowering of the partly vitrified soot body through the heating zone the vitrification portion will further increase upwards, finally resulting in a completely vitrified quartz glass body.

Vitrification of the full cylindrical soot body in vertical orientation of its longitudinal axis from the bottom to the top must be carried out at an exactly controlled feed rate and temperature adjustment to minimize the risk that sub-areas of the quartz glass body still contain gas inclusions which can no longer be removed during shaping. In this connection it has turned out to be useful when during zonewise vitrification the soot body is supplied to the heating zone at a feed rate in the range between 2 and 10 mm/min. The feed rate in the range between 2 and 10 mm/min yields, in combination with standard heating zone lengths of at least 30 cm, a residence time of the soot body in the heating zone that at least for typical dimensions of the soot body (with an outer diameter in the range of 300 mm to 400 mm) guarantees a complete vitrification.

The vitrification temperature is in one embodiment set in the range between 1200° C. and 1600° C. This applies to both the vitrification on the whole and to the zonewise vitrification.

The diagram in FIG. 1 schematically illustrates method steps (a) and (b) with an assembly for producing a full cylindrical blank by way of the method according to one embodiment.

First of all, a full cylindrical $SiO_2$ soot body 1, which is produced according to the VAD method and has been subjected to a drying phase, is supplied to a vacuum furnace, which has assigned thereto reference numeral 2 on the whole. The $SiO_2$ soot body 1 is introduced with an outer diameter of about 300 mm and a length of about 2 m from above into a vacuum furnace 2 which has a heating zone 21 with heating elements 21a, 21b arranged around a susceptor 22. The heating zone 21 is separately controllable in a vitrification section with heating elements 21a and in a shaping section with heating elements 21b, so that two portions of different heats can be set over the length 28 of the susceptor 22. The lower end of the vacuum furnace 2 is filled by a melt mold 23 which in its bottom plate 24 has a trough-like recess 24a.

In the first method step (a) the soot body 1 is introduced, suspended from a graphite chain 3 with a so-called quartz glass handle 4 and controlled by a movement unit 5, into the vitrification zone of the furnace 2 and heated therein to a temperature of about 1400° C. A negative pressure of less than 0.1 Pa (absolute) is maintained in the vacuum furnace 2. The full cylindrical soot body 1 is sintered and vitrified, respectively, in this process in a uniform manner, starting from its outer circumferential surface inwardly, resulting in a homogenous, bubble-free transparent quartz glass body 6 with an outer diameter of about 200 mm and a length of about 1.5 m. The full cylindrical quartz glass body 6 is provided at its lower end with a semispherical dome and forms at its upper end, fused with the quartz glass handle 4, an approximately spherical dome. The vitrification step is completed at a residence time of the soot body 1 of about 10 hours within the heating zone 21.

This is followed by shaping step (b). The vitrified, full cylindrical quartz glass body 6 is further lowered downwards onto the centrally arranged trough 24a in the bottom plate 24 of the melt mold 23 with the help of the graphite holder 4 and the movement unit 5 acting on the upper end. The round dome at the lower end of the quartz glass body 6 fits well into the trough-like recess 24a of the bottom plate 24. At the same time the temperature of the heating zone 21 in the area of the melt mold 23 is increased at a heat-up rate of 2.5 K/min from 1400° C. to 1750° C. The lower portion of the quartz glass body 6 which is held in the trough 24a of the bottom plate 24 in a central position is thereby softened and flows out gradually into the melt mold 23. The melt mold 23 is fully positioned within the lower portion of the heating zone 21, resulting in a homogeneous temperature profile across the height of the melt mold 23. The vacuum is maintained during the whole vitrification and shaping process.

After completion of this first heat-up and deformation phase the weight of the quartz glass body 6, which body presses onto the viscous quartz glass mass 7 and is not deformed yet, is approximately halved by comparison with the initial weight, and this is followed by a second shaping phase which substantially only regards the remaining upper portion of the quartz glass body 6. The temperature is here further increased at a higher heat-up rate of 5 K/min to 1800° C. During this heat-up phase the remaining upper portion of the quartz glass body also softens almost completely and flows out into the melt mold 23, the inner volume of the melt mold being filled almost completely. The supply of the quartz glass body 6 is controlled such that the graphite chain 3 is always kept under a slight mechanical tension. The graphite chain 3, the handle 4 and the upper portion of the quartz glass body thereby form a stretched assembly. Of help in this process is a force transducer (not illustrated here) on the graphite chain 3 or in the movement unit 5, the transducer ensuring that the graphite chain 3 is kept under tension by the graphite chain 3 only yielding to the degree as viscous quartz glass mass 7 is shaped from the quartz glass body 6. The ratio of the proportions of softened quartz glass mass 7 and of not yet softened quartz glass body 7 defines the supply movement by the holding device, consisting of the graphite chain 3 and handle 4, in combination with the movement unit 5.

It is the aim of these two shaping phases to adapt the viscosity of the quartz glass mass 7 within the melt mold 23 to the gradually decreasing weight of the quartz glass body that has not been shaped yet. The defined, slow and cautious reduction of the viscosity counteracts the formation of melt defects, for example, dislocations and helical bubble rings.

After that, in a last shaping phase, the previously reached temperature of 1800° C. is kept for another 20 minutes. This leads to a smoothing of the top side of the shaped quartz glass block and thus to a reduction of material losses.

After cooling the melt mold is opened and the blank is removed in the form of a full cylindrical quartz glass block. First of all, the dome with the quartz glass handle 4 is removed at the upper end of the blank by way of a horizontal cut which forms a front surface of the blank. Furthermore, a surface layer is removed on the lower front side and on the circumference of the blank. This removes, for example, the elevation created by the trough in the bottom plate of the melt mold. The plane sides are polished, resulting in a diameter of 380 mm and a thickness of 200 mm for the blank. The blank is distinguished by freedom from bubbles, substantial freedom from striae and by a rotation-symmetrical property profile with respect to the refractive index and the OH content, as has been defined at the beginning by the deposition and other preceding process parameters. The blank is particularly suited for the production of quartz glass components for optics or for semiconductor manufacture, such as flanges and wafer carriers.

Although specific embodiments have been illustrated and described herein, it will be appreciated by those of ordinary skill in the art that a variety of alternate and/or equivalent implementations may be substituted for the specific embodiments shown and described without departing from the scope of the present embodiments. This application is intended to cover any adaptations or variations of the specific embodiments discussed herein. Therefore, it is intended that the embodiments be limited only by the claims and the equivalents thereof.

What is claimed is:

1. A method for producing an optical blank from synthetic quartz glass by vitrifying and shaping a porous, cylindrical $SiO_2$ soot body having a longitudinal axis in a heating zone including a melt mold with bottom plate, comprising:
    vitrifying the $SiO_2$ soot body in the heating zone at a vitrification temperature to form a full cylindrical, completely vitrified, transparent quartz glass body, and controlling a feed rate to bring the full cylindrical, completely vitrified, transparent quartz glass body into contact with a centering recess of the bottom plate; and subsequently
    shaping the vitrified quartz glass body by softening in the melt mold at a softening temperature and by forming a viscous quartz glass mass that at least partly fills a volume of the melt mold; and
    cooling the quartz glass mass and removal from the melt mold to form the optical blank.

2. The method of claim 1, wherein the centering recess of the bottom plate comprises a rotation-symmetrical recess.

3. The method of claim 1, wherein controlling the feed rate into the melt mold is carried out with a holding device acting on an upper end of the vitrified quartz glass body, in combination with a movement unit.

4. The method of claim 3, wherein the vitrified quartz glass body is shaped in the melt mold, starting with a lower end thereof to the upper end thereof, wherein the feed rate is controlled such that a mass of the quartz glass body supplied per time unit corresponds to the mass of the quartz glass body softened per time unit.

5. The method of claim 1, wherein the vitrified quartz glass body is brought into contact with the centering recess of the bottom plate at a feed rate in the range between 2 and 5 mm/min, and that the softening temperature is in the range between 1650° C. and 1850° C.

6. The method of claim 1, wherein the quartz glass mass is shaped at a substantially constant softening temperature for a period of time of 15 min to 200 min.

7. The method of claim 1, wherein shaping is carried out in a sub-area of the heating zone, the length of which is not more than half the length of the full cylindrical quartz glass body to be shaped.

8. The method of claim 1, wherein the porous $SiO_2$ soot body is a full cylindrical soot body that was produced according to a VAD method.

9. The method of claim 1, wherein during vitrifying the $SiO_2$ soot body in the heating zone, the vitrification temperature of the heating zone acts on the $SiO_2$ soot body in a vertical orientation of its entire length.

10. The method of claim 1, wherein the $SiO_2$ soot body is processed in vertical orientation of its longitudinal axis zonewise, starting with its lower end to its upper end.

11. The method of claim 10, wherein the $SiO_2$ soot body is supplied during zonewise vitrification at a feed rate in the range between 2 and 10 mm/min to the heating zone.

12. The method of claim 1, wherein the vitrification temperature is set in the range between 1200° C. and 1600° C.

13. A method for producing an optical blank from synthetic quartz glass by vitrifying and shaping a porous, cylindrical $SiO_2$ soot body having a longitudinal axis (L), in a heating zone including a melt mold with bottom plate, including the following method steps:
   (a) vitrifying the $SiO_2$ soot body in the heating zone at a vitrification temperature so as to form a full cylindrical, completely vitrified, transparent quartz glass body, and subsequently
   (b) shaping the vitrified quartz glass body by softening in the melt mold at a softening temperature and by forming a viscous quartz glass mass which fully or partly fills the volume of the melt mold, and
   (c) cooling the quartz glass mass and removal from the melt mold so as to form the optical blank, characterized in that during shaping in the melt mold according to method step (b) a feed rate is controlled such that the full cylindrical quartz glass body is brought into contact with a centering recess of the bottom plate.

14. The method according to claim 13, characterized in that the centering recess of the bottom plate is configured as a rotation-symmetrical recess.

15. The method according to claim 13, characterized in that controlling the feed rate into the melt mold is carried out by means of a holding device acting on an upper end of the vitrified quartz glass body, in combination with a movement unit.

16. The method according to claim 15, characterized in that the vitrified quartz glass body is shaped in the melt mold, starting with a lower end thereof to the upper end thereof, wherein the feed rate is controlled such that a mass of the quartz glass body supplied per time unit corresponds to the mass of the quartz glass body softened per time unit.

17. The method according to claim 13, characterized in that the vitrified quartz glass body is brought into contact with the centering recess of the bottom plate at a feed rate in the range between 2 and 5 mm/min, and that the softening temperature is in the range between 1650° C. and 1850° C.

18. The method according to claim 13, characterized in that the quartz glass mass is shaped at a substantially constant softening temperature for a period of time of 15 min to 200 min.

19. The method according to claim 13, characterized in that shaping is carried out in a sub-area of the heating zone, the length of which is not more than half the length of the full cylindrical quartz glass body to be shaped.

20. The method according to claim 13, characterized in that during vitrification according to method step (a) the vitrification temperature of the heating zone acts on the soot body in a vertical orientation of its entire length.

* * * * *